United States Patent Office 2,896,525
Patented July 28, 1959

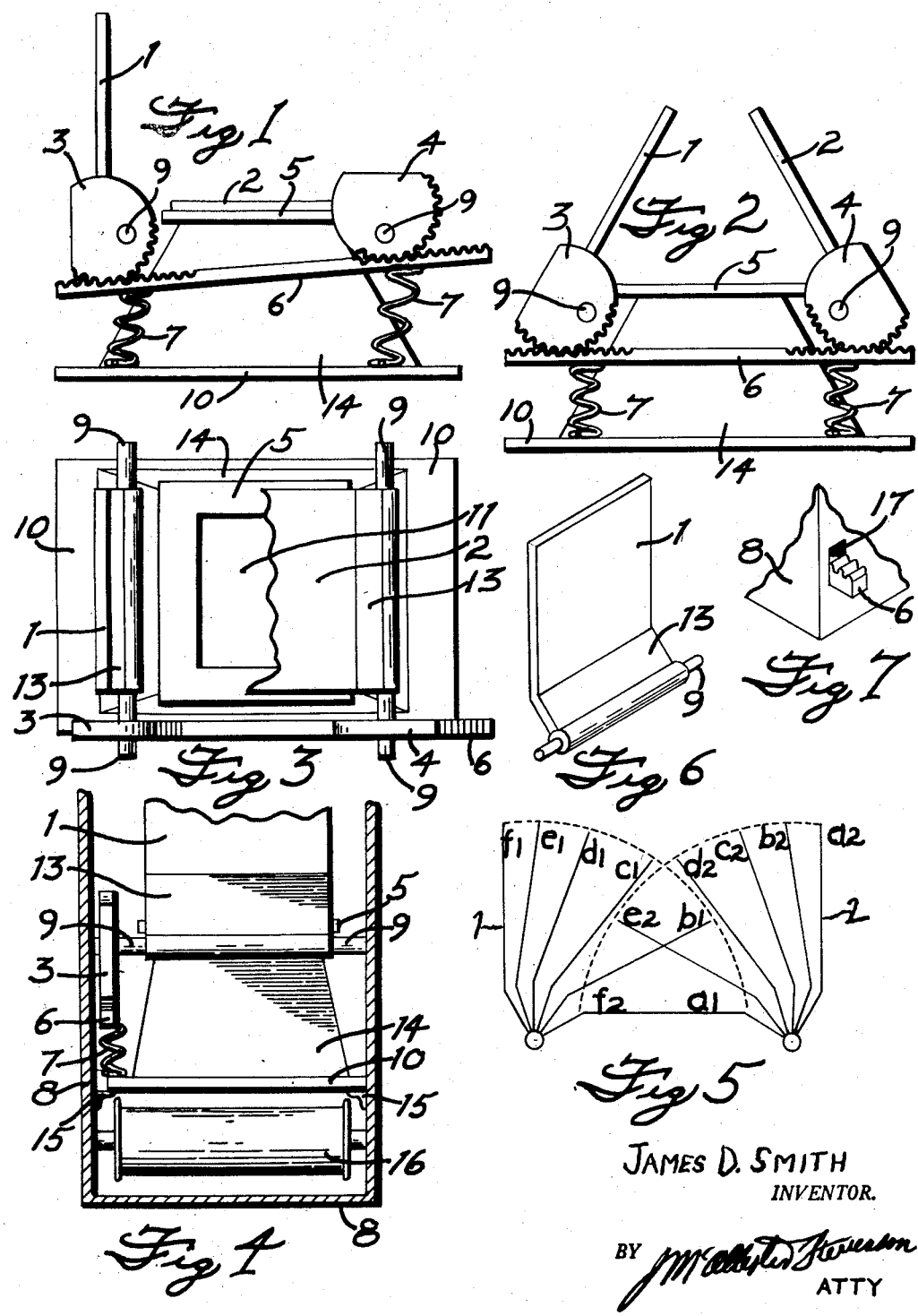

2,896,525

FOCAL PLANE SHUTTER

James D. Smith, Abilene, Tex.

Application April 5, 1954, Serial No. 420,910

5 Claims. (Cl. 95—58)

My invention relates to a focal plane shutter for a camera, and in particular to that type of shutter which has two coacting shutter blades each pivoted to swing through a right dihedral angle, the light passing to the film or plate between the edges of said blades away from and parallel to the pivot, said blades moving simultaneously, one from transverse or closed position to axial or open position, and the other from open position to closed position; and, in reverse, the first blade moves back to closed position, and the other moves back to open position, thereby completing a cycle.

The objects of my invention are to provide a shutter of this type which will not require special screening to keep the light from spoiling the film or plate, but will admit the light direct to the film or plate only during the period of exposure; to provide means for turning the two shutter blades simultaneously in opposite directions, each through a right dihedral angle; and to set the rate of angular advance in such turning faster or slower, according to the angular position of the blade, so that the blade moving outward from closed position will clear the path of the other blade which is then moving inward from open position.

With these objects in view my invention resides in the particular construction and arrangement of parts herein fully described and particularly pointed out in the claims.

Referring now to the drawings in which like characters indicate like parts:

Fig. 1 is a side elevation of the stop plate and shutter mechanism with blade 1 in open position and blade 2 in closed position.

Fig. 2 is a similar view of the same with the blades, 1 and 2, midway in moving from one position to the other;

Fig. 3 is a front view of the shutter mechanism and stop plate;

Fig. 4 is a plan view showing the camera box in horizontal section;

Fig. 5 is a diagram showing the relative position of each shutter blade as the blades turn from closed position to open position.

Fig. 6 is a perspective view of a shutter blade and its axle; and

Fig. 7 is a perspective view of a corner of the camera box showing the end of the rack 6 protruding.

The camera box 8 has at its end away from the lens a compartment containing two film rolls 16 which turn on axles fastened to the camera box. Between the rolls 16 the film is guided to be held against the far side of the base flange 10 of the stop plate 5 that being the focal plane. It is obvious that the camera may be arranged to use plates instead of films if desired.

This compartment for the spools 16 is closed by the base flange 10 of the stop plate which fits the end of the camera box 8 and is supported by the brackets 15 fastened to the walls of the camera box. The base flange 10 has a large opening and four pyramidal walls attached to it and surrounding the opening extending forward to where they join the flange or frame of the stop plate 5 parallel to base flange 10 and normal to the path of light. This stop plate 5 has an opening 11 through which the light is to pass to the focal plane.

This opening 11 is completely closed by the shutter blade 1, or the shutter blade 2, extending transversely across it when the particular blade is in transverse or closed position.

Each of the shutter blades is of thin metal and has a substantially square blade portion, 1 or 2, a rectangular portion 13 of the same width bent at an obtuse angle and ending in a barrel which surrounds and holds the axle 9. Each of these axles 9 is mounted and journaled in the camera box 8 parallel to the film spool 16 and to one side of the pyramidal box 14. The obtuse angle of the bend in the blade is such that when the axles 9 are so journaled either shutter blade 1 or shutter blade 2 can lie squarely on top of stop plate 5 and close the opening 11.

On the axle 9 of shutter blade 1 is firmly mounted the eccentric pinion 3; and on axle 9 of shutter blade 2 the eccentric pinion 4, both being so mounted prior to the mounting of the axles in their journals. These pinions, 3 and 4, are each so mounted that the radius is shortest on a line perpendicular to blade 1 or blade 2. Since the teeth of the rack 6 mesh with the teeth of the pinion, 3 or 4, in an axial plane passing through the axle 9 it follows that the pitch radius is shortest when the blade 1 or blade 2 is in transverse or closed position, and increases until it is longest when blade 1 or blade 2 is in axial or open position.

The rack bar 6 has enough teeth at or near each end to provide for meshing with all of the teeth on pinion 3 and on pinion 4; it is supported on springs 7, 7 fastened to base flange 10 which bend to the right or left as the rack bar 6 is manipulated, and hold the rack bar 6 resiliently against the pinions, 3 and 4. Because of this bending of the springs, 7, 7 a special spring pressed mounting in which the rack bar 6 will slide is not needed. The end of the rack bar 6 protrudes through a hole 17 in the corner of the camera box 8 where it can be pulled out or pushed back to effect motion of the shutter plates, 1 and 2, back and forth between open position and closed position.

The effect of increasing the pitch radius of the pinion 3, or of the pinion 4, by reason of the eccentric mounting of each pinion, is to reduce correspondingly the rate of angular advance of the shutter blade 1, or of the shutter blade 2. Thus the blade 1 will move outwardly from transverse or closed position at the greatest rate of angular advance, such rate diminishing continuously until it is much reduced as the blade approaches axial or open position.

Fig. 5 is a diagram which shows the corresponding position of each blade as the two blades are moved at the same time. Thus stations $a1$, $b1$, $c1$, etc. show the positions of blade 1 as it moves outward from closed position to open position, while stations $a2$, $b2$, $c2$, etc. show the corresponding positions of the blade 2 as it moves inward from open position to closed position. The dotted circular lines in the diagram represent the envelopes of the outer edge of each of the blades, 1 and 2. It will be seen that the outward moving blade must clear the path of the inward moving blade, and that therefore it must have a greater rate of angular advance. What the short pitch radius shall be for giving more rapid advance, and the long pitch radius shall be for giving slower advance, can be controlled in making the eccentric setting of the pinion 3, and of the pinion 4. It is necessary only that the rate of advance of each blade be such that one blade shall clear the other.

The distances between $b1$ and $b2$, $c1$ and $c2$, $d1$ and $d2$, $e1$ and $e2$ in the diagram indicate the gap between the outer edges of blade 1 and blade 2 through which the light from the lens can pass to the focal plane. Taken in the order named they show a passage of the light from right to left over the film, and in the reverse order a passage from left to right.

The operation of my focal plane shutter has been set forth in the above description.

What I claim as new, and desire to secure by Letters Patent of the United States, is:

1. In combination, a camera, comprising a pair of axles parallel to each other supported by a camera frame and disposed on opposite sides of the exposure aperture of the camera, a pair of shutter blades each of sufficient size to close the exposure aperture and each fastened to one of said axles, means mounted on each axle for turning the blades thereon through a dihedral angle between closed position over said aperture closing same and open position substantially at right angles thereto with the shutter blade parallel to the path of light, a member movable in either direction at substantially a right angle to said axles provided with means contacting said turning means for actuating same as said member is moved, said turning means being set in contact with said actuating means at such position that when one shutter blade is in closed position the other shutter blade is in open position and vice versa, said turning means being arranged to provide for more rapid angular advance, as said member is moved, of the shutter blade which is in closed position as its outward movement begins, and for slower angular advance of the blade which is in open position as its inward movement in the same direction of rotation begins.

2. In combination, a camera, comprising a pair of axles parallel to each other supported by a camera frame and disposed on opposite sides of the exposure aperture of the camera, a pair of shutter blades each fastened to one of said axles, an eccentric pinion mounted on each axle for turning the blade thereon through the dihedral angle between closed position over said aperture closing same and open position substantially at right angles thereto with the shutter blade parallel to the path of light, a rack movable in either direction at substantially a right angle to said axles provided with teeth engaging each of said pinions at such setting that when one shutter blade is in closed position the other is in open position, each eccentric pinion being so mounted that its pitch radius increases from closed position to open position, and means to hold said rack in contact with both pinions as it is moved back and forth.

3. In combination, a camera, comprising a pair of axles parallel to each other supported by a camera frame of the camera box and disposed on opposite sides of the exposure aperture of the camera, a shutter blade fastened to each of said axles, each of said blades turnable through a dihedral angle between closed position over said aperture closing same and open position substantially at right angles thereto with the shutter blade parallel to the path of light, an eccentric pinion mounted on each axle for turning the shutter blade mounted thereon through such dihedral angle, each such pinion having its greater radius for the open position of its shutter blade, a rack movable in either direction at substantially a right angle to said axles provided with teeth engaging each of said pinions and having an end extending outside of the camera box through an opening therein, said rack being supported on the camera box frame by spring means pressing it into contact with said pinions.

4. A pair of shutter blades and means for turning each blade through a substantially right dihedral angle as set forth in claim 2, the means to hold said rack in contact with both pinions being resilient means mounted upon a base supported by the camera frame, said resilient means pressing said rack toward such contact as it is moved back and forth.

5. A pair of shutter blades and means for turning each blade through a substantially right dihedral angle as set forth in claim 2, the means to hold said rack in contact with both pinions being a plurality of springs each fastened at one end to a base supported by the camera frame and at the other end to said rack.

References Cited in the file of this patent

UNITED STATES PATENTS

| 1,233,571 | Hansen | July 17, 1917 |
| 1,690,292 | Grosso | Nov. 6, 1928 |
| 2,347,951 | Hunter | May 2, 1944 |

FOREIGN PATENTS

| 142,043 | France | Mar. 30, 1881 |
| 8,925 | Switzerland | Sept. 6, 1894 |